United States Patent Office 3,734,782
Patented May 22, 1973

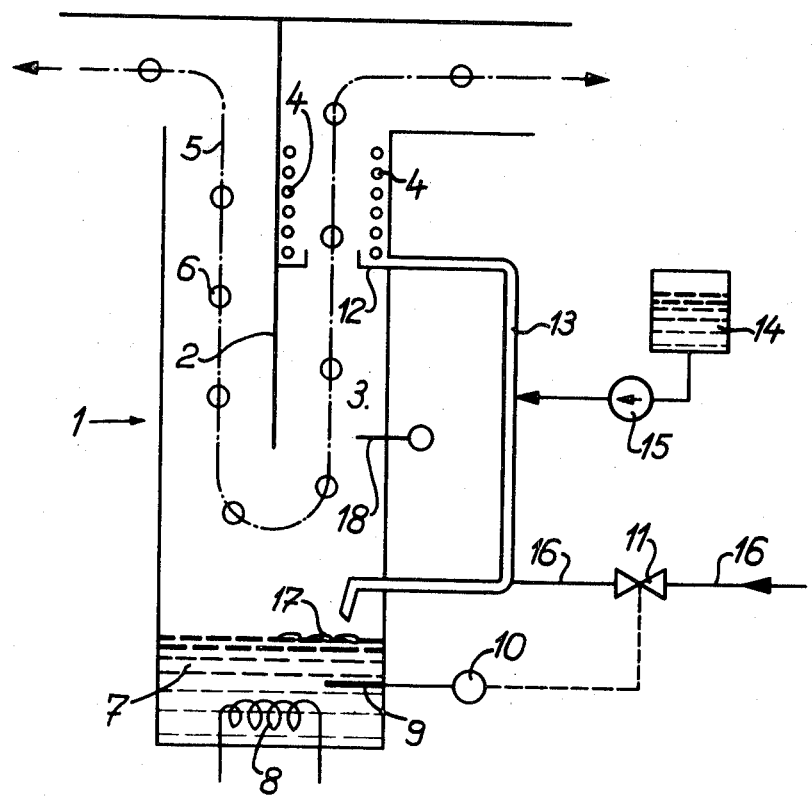

3,734,782
PROCESS FOR TREATING SURFACES OF
ALUMINIUM AND ALUMINIUM ALLOYS
René Laroche, Beaurepaire, France, assignor to
Aluminium Suisse S.A., Chippis, France
Filed Apr. 26, 1971, Ser. No. 137,566
Claims priority, application Switzerland, Apr. 29, 1970,
6,420/70
Int. Cl. C23f 7/06
U.S. Cl. 148—6.3                                  12 Claims

ABSTRACT OF THE DISCLOSURE

A surface layer of aluminium hydrate is formed by exposure of an aluminium surface to a gaseous mixture of water, an organic solvent, and a volatilized alkaline catalyst. The percentage by weight of water in the mixture is less than the percentage by weight of an azeotrope of water with the solvent, and is preferably below 10%, for example between 2% and 4%.

---

This invention relates to the surface treatment of aluminium or aluminium alloys so as to cover such surfaces with a generally amorphous layer of aluminium hydrate, often called the boehmite layer after the name of the crystalline form of the monohydrate. Such treatment is particularly employed for surfaces which are to be varnished after removal of grease, and notably after removal of grease by means of organic solvents such as chlorine or fluorine hydrocarbons. Without such a treatment, the metallic surfaces and the normally used varnishes are incompatible as manifested by an insufficient adherence of the varnish layer, an irregular thickness of the layer, or by faults in the layer.

To carry out this treatment, it is known to treat the surfaces with hot water or water vapour which reacts with the aluminium to form a hydrate having the general formula $Al_2O_3,nH_2O$, with the liberation of hydrogen.

It has also been proposed to carry out this treatment at a temperature greater than 100° C., under a pressure greater than atmospheric pressure. This has the advantage of increasing the speed of reaction; but treatment under high pressure has the drawback of necessitating the use of an autoclave which is not suitable for continuous operation.

It is the aim of the invention to provide a process which enables an efficient surface treatment of aluminium or aluminium alloys at temperatures which can be greater than 100° C. and at atmospheric pressure, whilst avoiding the disadvantages of the known processes.

According to the invention, there is provided a process for the treatment of a surface of aluminium or an aluminium alloy to form a surface layer of aluminium hydrate, in which said surface is exposed to an atmosphere of a gaseous mixture obtained by heating: water, an organic solvent the boiling point of which is greater than 100° C. at atmospheric pressure and which can form an azeotropic mixture with water, and a volatile alkaline catalyst; the proportion by weight of water in said gaseous mixture being less than the proportion by weight of water in an azeotropic mixture of said solvent and water.

Preferably, the water vapour content of the said gaseous mixture is no greater than 10% weight.

Carrying out the process and the supply of organic solvent of water, an alkaline volatile substance can take place in different manners and by different means according to the particular case. Thus, the components can be supplied separately or mixed in the liquid or gaseous state in a chamber where the treatment takes place. If the components are supplied in liquid form, they are converted by heating to the gaseous form before they are made to act on a surface to be treated.

Additionally, it has been observed that it is preferable to avoid the production of heterogeneous condensation of the gaseous mixture on the surfaces to be treated. Whilst the components of this mixture are miscible in the gaseous state, such is not always the case when in the liquid state; if a supersaturation is produced for the two principal components, the condensate formed separates into organic solvent, wetting the aluminium surface, and into droplets of water. The heterogenous nature of such liquids on the surfaces to be treated unfavourably influences the regularity of the hydrate layer being formed. In turn, the structural faults of the hydrate layer are the cause of an irregular adhesion of varnish which consequently leads to rejects.

Consequently, according to a preferred mode of carrying out the invention, the gaseous mixture, at least in the zone where it is in contact with surfaces to be treated, as well as the surfaces to be treated themselves, are maintained at a temperature greater than that for which a condensation of the gaseous mixture into liquid in several non-miscible phases would be produced. It is also advantageous that objects of aluminium to be treated are introduced into the treatment chamber at a temperature greater than that of the gaseous mixture. Contact of an object to be treated with any liquid possibly present in the bottom of a treatment chamber should also be avoided.

The organic solvent can, for example, be perchlorethylene the boiling temperature of which is 121° C. under atmospheric pressure. With water, perchlorethylene forms an azeotropic mixture with 17.2% by weight of water and the boiling point of which is 88.5° C. However, as the two components are not miscible, it is possible to add water in such a quantity that it does not entirely cover the surface of the perchlorethylene which, upon heating up to 100° C. evaporates therefrom according to the environmental conditions. It is thus possible by heating above 100° C. or by boiling the perchlorethylene in the presence of water, to obtain gaseous mixtures of a composition and temperature suitable for operation of the process of the invention, for example containing at least 90% of solvent and at most 10% of water, each in its gaseous state, the water vapour being able to be raised to a temperature greater than 100° C. by contact with the vapour evaporating from the free surface of the solvent.

It is thus possible, by dosing the supply of water in the liquid or vapour state into a chamber where perchlorethylene is provided at the required temperature, namely at the boiling temperature, to obtain gaseous mixtures of different compositions which, without condensing, are also stable above 100° C. at normal pressure. Temperatures above 100° C. are preferably utilized. In general, temperatures of from 110 to 120° C. in the treatment zone can be reached without difficulties and lead to satisfactory results.

Consequently, it is possible to provide a gaseous mixture having a water content comprised between 1 and 10% by weight, preferably between 1 and 5%, for example between 2 and 4%, the rest of the gaseous mixture being formed substantially of perchlorethylene, with a concentration of an alkaline volatile product situated in general between 1 and 1,000 p.p.m. (parts per million).

The alkaline product can be ammonia or a volatile amine such as triethylamine for example, and serves as a catalyser to accelerate the reaction of water and aluminium.

The addition of alkaline substance can take place either in a pure form, or in the form of an aqueous solution, by means of a pump or a dosing valve.

It is also possible, after experimental determination of the losses of water and solvent, to use a dosing device, for example a dosing pump, supplying given quantities of the two liquids in a continuous manner or at defined time intervals.

The process according to the invention can take place after degreasing the objects by means of organic solvent in a suitable device, and in which aluminium objects are treated at least partially in the vapour phase. Alternatively, the process can take place in an independent installation following any type of previous surface cleaning treatment. The process has the advantage, especially when the treating chamber for the surface directly follows a a degreasing installation using organic solvents, of employing an atmosphere of solvent vapour in both installations which protects the surfaces of the objects until the end of the operation. Moreover, it is possible to use a common transfer speed suitable for the two processes of degreasing and surface treatment which enables continuous operation. In fact, in general, the reaction time necessary for the treatment for each article does not exceed one minute; a time of 15 to 30 seconds is often sufficient.

The efficiency and the simplicity of this process offer a wide field of application. It enables the widespread use of degreasing by means of organic solvents for any aluminium article which must undergo a varnishing operation. Moreover, it can be used in applications other than for varnishing, whenever it is desired to cover a surface with aluminium or aluminium alloys by a layer of aluminium hydrate.

An example of carrying out the process of the invention will now be described with reference to the accompanying drawings which schematically show, also by way of example, an installation for carrying out this process.

A treatment chamber 1 forming part of a continuous treatment installation is located immediately downstream of a degreasing installation (not shown). The upper part of chamber 1 is divided into upper left and right hand compartments by a separating partition 2 over about ⅔ of the total height of the chamber. At the top of chamber 1 at the outlet of a right-hand compartment 3, are located condensers 4 cooled by a refrigerating liquid. A conveyor 5 on which aluminium objects 6 to be treated are fixed enters into the left-hand compartment of the chamber 1, passes below the partition 2, through the right-hand compartment 3 and out of the chamber 1 between the condensers 4. At the bottom of the chamber 1, at a level lower than the lowest point of the path of conveyor 5, is a quantity of liquid perchlorethylene 7 heated by means of a heater 8. The temperature of the liquid perchlorethylene 7 is measured by means of a thermo-element 9 connected to a thermoregulator 10 which, by acting on a valve 11, controls the amount of water to be added to the treatment chamber from a conduit 16 and through a conduit 13. A mixture of liquid perchlorethylene, water and an alkaline substance condensed on the condensers 4 is gathered in a collector 12 and is delivered by an outer conduit 13 to the lower part of the chamber 1. To this conduit 13, alkaline solution is supplied from a reservoir 14 in quantities dosed by means of a pump 15, as well as the complement of water necessary to compensate for losses and to maintain a desired mixture, this water being fed through the conduit 16 as mentioned previously. This water floats in "pools" on the surface of the hot perchlorethylene from where it evaporates at the same time as the perchlorethylene, the heat required for evaporation of the water being supplied from the mass of perchlorethylene the temperature of which, for constant heating, stabilises at a value which decreases with the quantity of water to be evaporated per unit time, and consequently with an increase in the proportion of water vapour in the gaseous phase.

This installation forms practical means for controlling the water vapour content by regulating the supply of water by means of valve 11 in such a manner that the temperature of the mass of perchlorethylene is held at a desired value, for example about 115° C. In these conditions, a gaseous mixture is formed by evaporation, this gaseous mixture having a temperature only slightly lower than 115° C. and a water vapour content comprised between about 2.1 and 2.7% by weight. This mixture rises in the chamber 1 and acts on the surfaces of the objects 6 fixed on the conveyors 5, then condenses on the coolers 4 which, apart from inevitable losses, prevent the vapour from escaping from the chamber. The temperature of the gaseous mixture can be measured by means of thermoelement 18. Upon passage between the condensers 4, the film of perchlorethylene covering the surfaces of the hot objects evaporates rapidly and these objects leave the installation dry.

When perchlorethylene is also used at its boiling point in the degreasing installation preceding the surface treating chamber, the objects are delivered through the degreasing installation at a temperature of about 120° C. and, with their surfaces damped with perchlorethylene, penetrate into the treating chamber 1 at a temperature greater than that of the gaseous mixture therein, which avoids condensation of water on their surfaces. The objects to be treated pass at some distance above the surface level of the perchlorethylene 7 and are thus not damped thereby and notably by water floating on its surface.

It is clearly possible to make modifications to the described mode and apparatus for carrying out the invention without departing from the scope of the invention, as defined in the appended claims. It is for example possible to directly deliver the recondensed mixture of solvent, water and volatile alkaline substance to the bottom of the chamber by means of a conduit located therein, and supply the necessary additives of water and volatile alkaline substance by means of separate conduits. It is also possible to carry out the process of the invention without using a certain quantity of liquid solvent at the bottom of the chamber but, for example, by delivering water and solvent in the desired proportion directly onto a heated surface upon contact with which these liquids evaporate rapidly, then rapidly delivering the gaseous mixture thus produced (with addition of the volatile alkaline product) onto the surfaces to be treated, and by collecting the condensate at the output of the installation for recycling.

Moreover, it is also possible to supply the water and/or solvent to the treatment chamber directly in the gaseous phase or even to use superheaters in the treating chamber by means of which it is possible to maintain the gaseous mixture at temperatures slightly greater than those which would be obtained by simple boiling.

What is claimed is:

1. A process for the treatment of a surface of aluminium or an aluminium alloy to form a surface layer of aluminium hydrate, in which said surface is exposed to a gaseous atmosphere comprising a gaseous mixture obtained by heating: water, an organic solvent, the boiling point of which is greater than 100° C. at atmosphere pressure and which can form an azeotropic mixture with water, and a volatile alkaline catalyst; the proportion by weight of water in said gaseous mixture being less than the proportion by weight of water in an azeotropic mixture of said solvent and water.

2. A process according to claim 1, in which the proportion by weight of water in said gaseous mixture is less than 10%.

3. A process according to claim 2, in which the proportion by weight of water in said gaseous mixture is comprised between 1% and 5%.

4. A process according to claim 3, in which the proportion by weight of water in said gaseous mixture is comprised between 2% and 4%.

5. A process according to claim 1, in which said gaseous mixture is substantially at atmospheric pressure at a temperature above 100° C.

6. A process according to claim 1, in which a surface to be treated and said gaseous mixture in the vicinity of said surface are at a temperature greater than the temperature at which the components of said gaseous mixture could condense onto said surface.

7. A process according to claim 1, in which said organic solvent and water are at least partially miscible in the liquid phase.

8. A process according to claim 1, in which said organic solvent is perchlorethylene.

9. A process according to claim 1, in which said alkaline catalyst is ammonia.

10. A process according to claim 1, in which said alkaline catalyst is a volatile amine such as trimethylamine.

11. A process according to claim 1, in which surfaces to be treated are degreased by means of an organic solvent prior to said treatment.

12. A process according to claim 1, in which said gaseous mixture is provided by heating together a liquid mixture of water, the organic solvent, and the volatile alkaline catalyst, the proportion by weight of water in said liquid mixture being less than the proportion by weight of water in an azeotropic mixture of said solvent and water.

References Cited

UNITED STATES PATENTS

| | | | |
|---|---|---|---|
| 773,368 | 10/1904 | Bower et al. | 148—6.35 |
| 2,859,148 | 11/1958 | Altenpohl | 148—6.27 |
| 3,247,026 | 4/1966 | Switzer | 148—6.27 X |
| 3,380,860 | 4/1968 | Lipinski | 148—6.27 |
| 3,481,798 | 12/1969 | Raether | 148—6.27 |
| 3,544,391 | 12/1970 | Scott | 148—6.27 |

RALPH S. KENDALL, Primary Examiner

U.S. Cl. X.R.

148—6.27